United States Patent [19]

Dischert

[11] 3,857,526

[45] Dec. 31, 1974

[54] REEL MOUNTING APPARATUS

[75] Inventor: William Arnold Dischert, Burlington, N.J.

[73] Assignee: RCA Corporation, New York, N.Y.

[22] Filed: Nov. 9, 1973

[21] Appl. No.: 414,321

[52] U.S. Cl. .............................................. 242/68.3
[51] Int. Cl. ........................................... B65h 17/02
[58] Field of Search ........................... 242/68.3, 72.1; 287/DIG. 5

[56] References Cited

UNITED STATES PATENTS

| | | | |
|---|---|---|---|
| 3,058,686 | 10/1962 | Field | 242/68.3 |
| 3,124,319 | 3/1964 | Cohen | 242/68.3 |
| 3,345,012 | 10/1967 | Ek | 242/68.3 |
| 3,464,642 | 9/1969 | Kobel | 242/68.3 |

*Primary Examiner*—Edward J. McCarthy
*Attorney, Agent, or Firm*—Eugene M. Whitacre

[57] ABSTRACT

A reel mounting device is provided to hold and lock a record medium reel in a desired mounting position. A bistable camming member causes a plurality of freely movable captive ball like members to engage the reel hub through an apertured housing. The ball like members when cammed engage an edge of the central reel aperture of the reel hub to provide a dual holding and locking force. The device is structured in a manner which eliminates complex keying and retracting apparatus for the reel engaging members.

10 Claims, 5 Drawing Figures

REEL MOUNTING APPARATUS

The invention relates to a reel mounting apparatus which includes a hub for receiving a reel which holds an elongated record medium such as a magnetic tape.

Presently, such reels are utilized in tape handling machines such as those found in digital computers, audio and video tape recorders and film projectors.

Several techniques have been proposed in the prior art for mounting reels. One such method of mounting comprises a "force-fit" mounting. In this mounting, a tape reel is fitted over a hub having a resilient material, such as rubber, on its peripheral surface. After the reel is in place about the hub, the resilient material is caused to expand radially thereby gripping the inner surface of the central opening in the reel. Radial expansion of the resilient material may be accomplished by providing a face plate which is fitted over the hub on top of the reel. By tightening the face plate by means such as a bolt, a desired degree of expansion of the resilient material is accomplished. This type of reel mounting may have disadvantages. For example, the replacement time required for changing reels is relatively long and the reel changing operation is relatively slow.

To circumvent such disadvantages, the prior art proposes a number of radially extending jaws for urging a resilient surface against the central opening of the reel. The jaws are spring biased radially inward and urged by a central actuator into engagement with the reel. Such an arrangement is shown and described in U.S. Pat. No. 3,124,319, issued on Mar. 10, 1064, to N. B. Cohen et al. Such an arrangement, however, requires the provision of complex slideways and a retracting mechanism for the jaws. In addition, a keying arrangement is required for providing proper cooperation between the actuating mechanism and the reel engaging jaws.

In addition, the systems referred to above must rely upon a radially directed expansion force for maintaining the reel in the desired position on the hub during operation.

These and other problems are avoided or overcome by the tape reel mounting device shown and described herein. Briefly, in accordance with one embodiment of the invention, there is provided an apparatus including a device for mounting a reel thereon. The apparatus includes a base member, a housing on the base member surrounding a central axis and having a plurality of spaced tapered apertures in the periphery thereof. A corresponding plurality of first elements are disposed within the housing and are freely movable toward and away from the axis. A plurality of second elements are provided which pass through a portion of the periphery of the housing. Actuating means are mounted within the housing and have two stable positions. Means including the second elements are provided for establishing the position of the actuating means. The actuating means in a first position cause the first element through the apertures to urge the reel toward the base member and away from the axis.

The invention with its advantages will become readily apparent upon a reading of the following detailed description in conjunction with the attached drawings in which.

Figure 1:
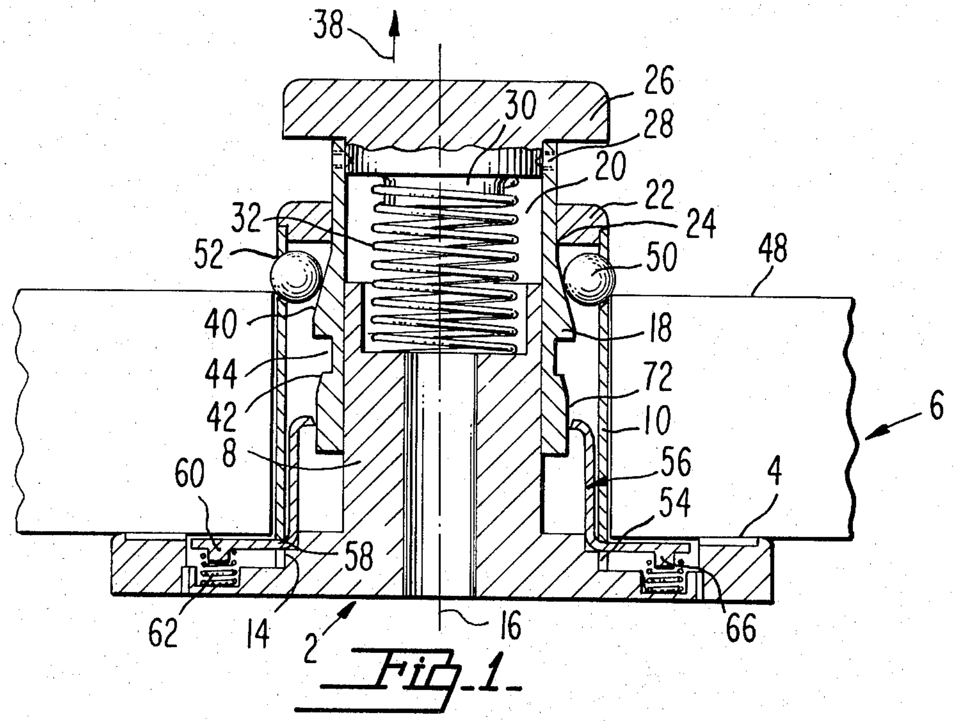
FIG. 1 is a sectional view along line 1—1 of FIG. 3 of an embodiment of the invention.

As shown in the figures, there is provided a base member 2. The base member includes a generally planar surface 4 for receiving and supporting a well-known type of flanged tape or film reel 6. The base member 2 also includes a generally cylindrical upstanding central portion 8. Surrounding the upstanding portion 8 of the base member is a hollow cylindrical housing member 10. The housing member is spaced from the upstanding portion 8 of the base member and forms an enclosure 12 therebetween. The housing member is mounted in the planar portion 4 of the base member by means of an annularly extending groove 14.

Mounted for slidable movement in the direction of the central axis 16 through the base member is an actuating element 18. The actuating element 18 has an internal void or opening 20 defined by inner cylindrical peripheral walls which are fitted over the upstanding portion 8 of the base member. A closure member 22 is secured to the upper end of the housing member. The closure member 22 includes an annular opening 24 through which a portion of the actuating member 18 protrudes.

Secured to the protruding portion of the actuating member 18 is a top or cap member 26. The cap member is secured within the opening 20 of the actuating member 18 by means such as screws 28. The cap 26 includes a portion 30 extending into the internal opening 20 in the actuating member 18. One end of a coil spring 32 is disposed about the portion 30 of the cap member 26. The other end of the coil spring is disposed in a central recess 34 formed in the upstanding portion 8 of the base member. A through hole 36 communicating with the recess is utilized in mounting the reel holding apparatus in a transport system. The coil spring 32 end bears on a surface portion of the recess 34 and is effective to urge the actuating member 18 and cap in the direction of arrow 38.

The outer peripheral surface of the actuating member 18 includes first 40 and second 42 annularly extending truncated conical surfaces separated by a recess 44. The conical portions 40, 42 of the actuating member serve as camming surfaces and are operable in a manner hereinafter described.

A first plurality of tapered apertures 46 are formed in the peripheral surface of the housing member 10. The apertures 46 are preferably circular and spaced from the planar portion 4 of the base member by a distance so as to be adjacent to an end of the hub 48 of a tape reel when disposed about the housing. A plurality of spherical ball like members 50 are disposed between the housing 10 and the actuating member 18. The number of ball like members 50 corresponds to the number of apertures 46 spaced about the housing 10. The ball like members 50 are freely movable toward and away from the central axis 16. The tapered edges 52 of the apertures 46 and the exterior surface of the actuating member 18 confine movement of the ball like members 50 to an area adjacent the apertures 46. Further, the relative size of the ball like members 50 and the apertures 46 is such as to inhibit passage of the ball like members completely through the apertures 46.

In the area of joinder of the housing 10 with the planar portion 4 of the base member 2 there are provided further apertures 54 through the peripheral wall of the housing member 10. Generally L-shaped members 56 are disposed through the apertures 54. The L-shaped members 56 include horizontal and vertical portions having an area of orthogonal intersection 58 which is pivotable about the portion of the housing member 10 defining the apertures 54. The horizontal portion 60 of the member, when positioned as shown in FIG. 1, is disposed to be below the planar surface 4 of the base member 2.

A coil spring member 62 coupled between the bottom portion of the recess 64 and a protrusion 66 on the member urges the portion 60 out of the recess 64 in the direction of arrow 68. The vertical portion of the member 56 includes a hook like end 70 which is adapted to slidably engage the outer surface of the actuating member 18. The engagement of the end 70 with the surface 72 of the actuating member 18 as shown in FIG. 1 inhibits rotation of the member 56 about the aperture 54 and maintains the portion 60 below the planar surface 4 of the base member 2. The hooked end of member 56 is adapted for captively engaging the recess 44 formed in the outer surface of the actuating member 18 when it is disposed in the position shown in FIG. 2. As indicated, cooperation between the member 56 and the actuating member 18 is maintained by action of the coil spring 62. The camming surface 42 of the actuating member 18 enables proper transition between its two stable states of cooperation with member 56.

Figure 2:
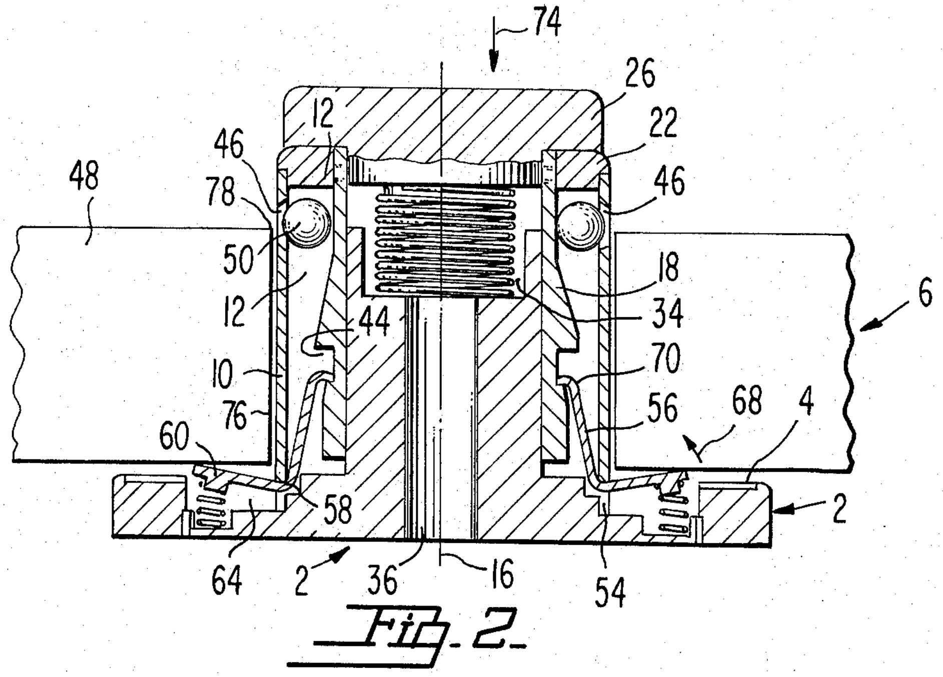
FIG. 2 is a further sectional view of the arrangement shown in FIG. 1, in a further operating condition.
Figure 3:
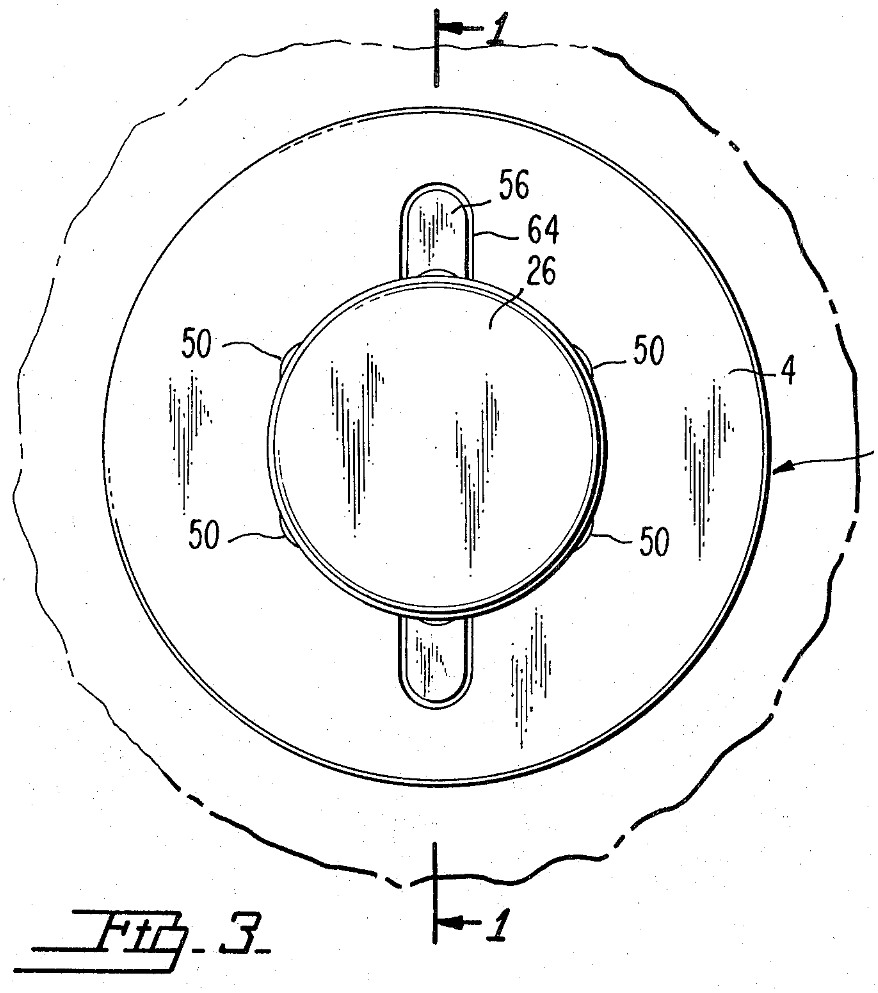
FIG. 3 is a top plan view of the arrangement of FIG. 1.

In operation, the device is disposed in the unlocked or reel loading/unloading position, as shown in FIG. 2, by an operator's force applied downward on the top or cap member 26 in the direction of arrow 74. The downward force causes the actuating member 18 to slide downward along the upright portion 8 of the base member, compressing the spring 32. As the actuating member 18 moves downward, the hook end 70 of the member 56 urged by the spring 62 captively engages the annular recess 44 in the outer surface of the actuating member. Movement of the end 70 of the member 56 into the recess 44 allows pivotal motion of the member 56 about the peripheral surface defining aperture 54 of the housing member, under the influence of the spring 62. This pivotal movement causes the portion 60 of the member 56 to be elevated above the planar surface 4 of the base member. For this condition, the ball like members 50, which are free to move toward and away from the central axis 16, will be disposed within the hollow area 12 between the outer portion of the actuating member 18 and the housing 10. Since the major portion of the ball like members 50 is always contained within the hollow space 12, the ball like members will tend to move downward in the hollow area 12. However, the spacing between the outer portion of the actuating member 18 and the lower tapered lip 52 of the apertures 46 is dimensioned to maintain the ball like members in an area adjacent the apertures 46.

Figure 4:
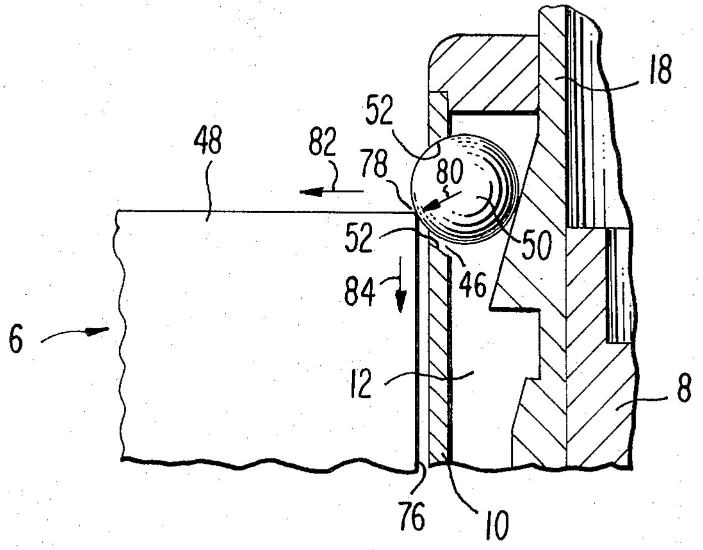
FIG. 4 is an enlarged detail view of a portion of the arrangement of FIG. 1.
Figure 5:
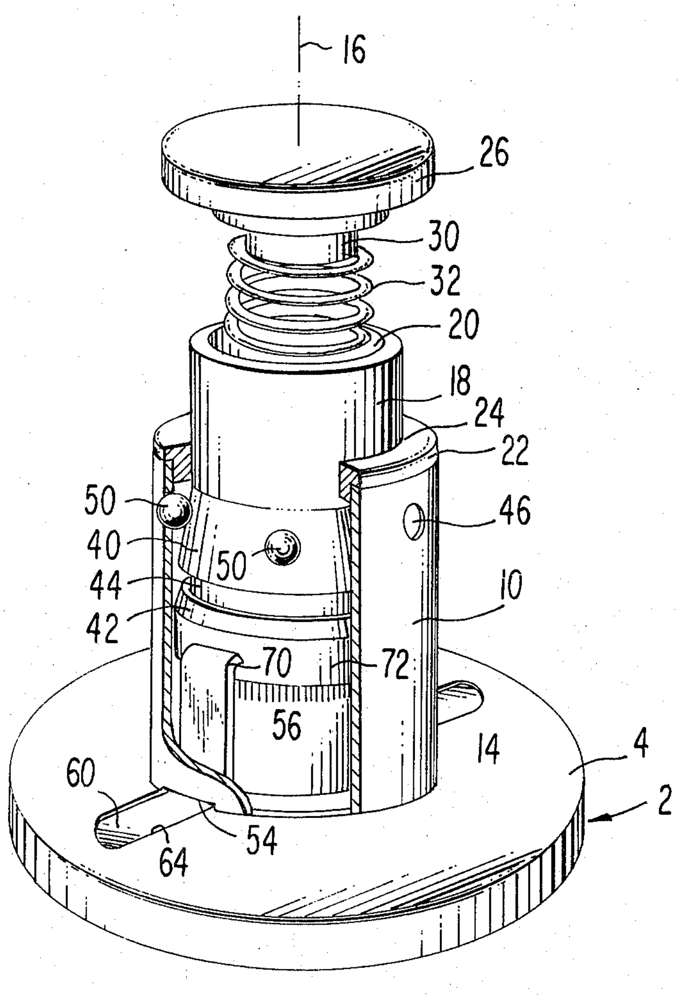
FIG. 5 is a disassembled perspective view of the arrangement of FIG. 1.

The reel 6 is now placed on the assembly by passing the central opening 76 of the reel over the member 26 and about the housing 10 toward the base member 2. It will be noted that the top or cap member 26 may be made to have a diameter slightly less than that of the housing 10, thus providing assistance in aligning and guiding the reel 6 onto and off of the housing. As the reel 6 is inserted about the housing 10 toward the base member, the lower reel flange comes into engagement with the portion 60 of the members 56 which are disposed above the planar surface 4 of the base member. Further movement of the reel 6 toward the planar surface of the base member causes the members 56 to pivot against the action of the springs 62. The pivotal movement of the members 56 causes the hooked end portion 70 of the member 56 to be pivoted out of the recess 44 in the actuating member 18. Under the influence of the spring 32, the actuating member 18 moves upward in the direction of arrow 38. This upward movement of the actuating member 18 causes the hooked end portion 70 of member 56 to ride along the cam surface 42 into engagement with the surface portion 72 of the actuating member 18. This causes the portion 60 to be disposed in the recess 64 below the planar surface 4 of the base member, thus assuring proper seating of the reel on the planar surface portion 4 of the base member. This movement of the actuating member further causes the conical cam surface 40 to engage the ball like members 50, holding urging them in a direction away from the central axis 16 toward the apertures 46. Upward movement of the actuating member 18 continues until a portion of the ball like members 50 engages the corner 78 of the reel 6 formed by the central opening 76 and the hub 48 of the reel. As shown particularly in FIG. 4, the conical cam surface 40 of the actuating member causes a force on the ball like members 50, urging them into the apertures 46 and into engagement with the upper tapered surface 52 of the apertures 46. The forces produced by the cam surface 40 and the upper tapered surface 52 of the apertures 46 causes a resultant force 80 on the corner 78 of the reel. This resultant force has a component radially outward 82 from the central axis 16 holdingg the reel with respect to the housing 10. In addition, the resultant force has a component in a downward direction 84 urging the reel 6 into firm contacting relation with the planar portion 4 of the base member 2. Thus, the action of the cam surface 40 on the ball like members 50 through the apertures 46 provides a dual holding force which acts on the reel 6. As shown in FIG. 1, the reel is now in a locked condition on the mounting apparatus and is ready for operation. The dual holding force 82, 84 provides centering of the reel about the housing, as well as pressure against the base member, thereby avoiding undesirable wobble of the reel during operation.

When it is desired to remove the reel 6 from the mounting, the operator causes the member 26 to move downward toward the base member against the action of the spring 32. The actuating member 18 is thus moved downward until the recess 44 is opposite the hooked end portion 70 of the member 56. The member 56 now pivots about the aperture 54 in the housing causing the hooked end portion to captively engage the recess, and the portion 60 urges the reel away from the planar surface 4 of the base member. At the same time, the cam surface 40 of the actuating member 18 is moved out of engagement with the ball like members 50; thus, the balls disengage the corner 78 of the reel, allowing the reel to be moved upward over the housing 10 and off the mounting.

It will be noted that the construction of the mounting apparatus described is such that the apertures 46 for the ball like holding members and the apertures 54 for the pivotable members 56 may have any relative circumferential location, including being vertically aligned. Thus, any number of the apertures 46 and ball like members 50 may be provided for evenly distributing the holding forces without concern for the number or placement of the pivotal members 56. Preferably, at least two pivotal members 56 are provided in opposite aligned relation for purposes of enhancing the distribution of operating forces in the device. While two such members have been shown, one is sufficient for operation; and more than two may also be utilized. In addition, it will be noted that the construction of the mounting apparatus is such that the actuating member 18 may be rotated with respect to the housing 10 and upstanding portion 8 of the base member, with the locking and unlocking operation of the device accomplished at any angular position. This provides the advantage of distributing any wearing forces on the actuating member and eliminates the necessity of any type of keying mechanism which adds to the complexity of the device. It will be further noted that, as shown particularly in FIG. 4, in response to the force of the cam surface 40, the ball like members protrude through the apertures until contact is made with the reel corner 78. Thus, the mounting arrangement described is capable of automatically compensating for variations of the central opening 76 of the reel and/or the dimension of the reel hub 48.

What is claimed is:

1. A device for maintaining a reel thereon, comprising: a base member, a housing on said base member surrounding a central axis and having a plurality of spaced tapered apertures in the periphery thereof, a corresponding plurality of first elements within said housing freely movable toward and away from said axis, a plurality of second elements passing through a portion of the periphery of said housing, actuating means mounted within said housing and having two stable positions, means including said second elements for placing said actuating means in one of said two stable positions, the device being so constructed and arranged that with said actuating means in one of said positions, said first elements communicate through said apertures to urge said reel toward said base member and away from said axis.

2. The invention according to claim 1, wherein said housing includes a further plurality of apertures, each of said second elements having respective end portions cooperating with said actuating means and said reel and a central portion pivotal about the periphery of said housing.

3. The invention according to claim 1, wherein said actuating means includes a member slidably movable in the direction of said central axis, said member including first and second surface portions with a recess therebetween, said first surface portion cooperating with said first elements, with said recess and said second surface portion cooperating with said second elements.

4. A device for maintaining thereon a reel having a mounting aperture, comprising: a base member having a surface for supporting said reel, an annular housing fixedly mounted to said base member about a central axis for receiving the mounting aperture of said reel, a plurality of tapered apertures spaced about said housing adjacent an end of said reel when disposed on said base member, a further member mounted within said housing for movement along said axis, means for urging said further member away from said base member, ball like members disposed between said housing and said further member at each of said tapered apertures, said further member having a portion for urging said balls into said apertures, said ball like members having a dimension to inhibit passage completely through said tapered apertures, further apertures in said housing, a latching member in each of said further apertures and pivotal about a portion of said housing defining said further aperture, said latching member in a first position having a first portion engaging said further member to inhibit movement thereof and a further portion disposed to urge a reel away from said base member.

5. The invention according to claim 4, including means mounted in said base member for urging said latching member to be disposed in said first position.

6. The invention according to claim 4, wherein said latching member has a second position thereof in which said further portion is spaced from a reel on said base member.

7. The invention according to claim 4, wherein said first portion of said latching means includes a hook like projection and said further member includes a recess for captively engaging said projection.

8. The invention according to claim 4, wherein said further member has a first cam surface for cooperation with said ball like members and a further cam surface for cooperation with said latching means.

9. The invention according to claim 4, wherein a latching means and one of said ball like members are in spaced relation along said housing and aligned with each other in the direction of said central axis.

10. The invention according to claim 4, wherein said further member is rotatable with respect to said housing about said central axis.

* * * * *